United States Patent [19]

Keppler et al.

[11] Patent Number: 4,846,015

[45] Date of Patent: Jul. 11, 1989

[54] ROBOT JOINT ARRANGEMENT

[75] Inventors: Rainer Keppler, Baiersdorf; Robert Kleemann, Erlangen, both of Fed. Rep. of Germany

[73] Assignee: Mantec Gesellschaft für Automatisierungs-und Handhabungssysteme MbH, Füth, Fed. Rep. of Germany

[21] Appl. No.: 68,801

[22] Filed: Jun. 26, 1987

Related U.S. Application Data

[63] Continuation of Ser. No. 779,391, Sep. 23, 1985, abandoned.

[30] Foreign Application Priority Data

Oct. 16, 1984 [DE] Fed. Rep. of Germany ....... 3437869

[51] Int. Cl.⁴ ............................................. F16H 37/06
[52] U.S. Cl. .................................. 74/665 GC; 74/479; 901/29
[58] Field of Search .................. 74/476, 479, 665 GC; 901/25, 26, 27, 28, 29, 48

[56] References Cited

U.S. PATENT DOCUMENTS

| 3,920,972 | 11/1975 | Corwin, Jr. et al. | 235/151 |
| 4,466,307 | 8/1984 | Kouno | 74/469 |
| 4,507,046 | 3/1985 | Sugimoto et al. | 901/29 |
| 4,564,741 | 1/1986 | Yasuoka | 901/29 |
| 4,589,816 | 5/1986 | Eberle et al. | 901/25 |

FOREIGN PATENT DOCUMENTS

| 2526504 | 7/1979 | Fed. Rep. of Germany . | |
| 1148721 | 5/1983 | Fed. Rep. of Germany . | |
| 2085398 | 4/1982 | United Kingdom | 901/25 |

Primary Examiner—Dwight G. Diehl
Attorney, Agent, or Firm—Kenyon & Kenyon

[57] ABSTRACT

A robot joint arrangement having two joints, in which each joint is equipped with an electric motor of its own and a reduction gear. To achieve a spacing as short as possible between the tilting axis (V) of the second joint and the flange surface for mounting the tool, the second joint is supported in a fork-like extension of the first joint.

1 Claim, 2 Drawing Sheets

ROBOT JOINT ARRANGEMENT

This application is a continuation of application Ser. No. 779,391, filed 9/23/85, now abandoned.

BACKGROUND OF THE INVENTION

The present invention relates to a robot joint arrangement having two joints arranged in tandem for providing a tilting motion in two orthogonal tilting axes, and in which electric motors and reduction gears are provided in the joints. Jointed robots and joint designs are known in varied embodiments (see, for instance, DE-AS 25 26 504, DE-AS 11 48 721). In part, the motors and reduction gears are integrated in the joints.

Industrial robots should be capable of being put together in a modular manner in the form of a building block system, require little space and should be assembly- and service-friendly. In addition, a high speed of movement and accuracy of positioning are generally required.

For fast gripper or tool orientation, it is, above all, of interest for the joints directly adjacent to the gripper or tool that the axis of rotation of a joint and the flange surface of the next joint be close together.

SUMMARY OF THE INVENTION

It is an object of the present invention to provide a design by which these requirements are met, and which at the same time provides high positioning accuracy and high mobility.

The above and other objects of the invention are achieved by a robot joint arrangement having two joints arranged in tandem for providing a tilting motion in two orthogonal axes, and in which electric motors and reduction gears are provided in the joints and wherein:

(a) the motor and the axially adjacent reduction gear of a first joint follow immediately upon a flange connecting the preceding part of the robot;

(b) the first joint has a fork-shaped extension at the opposite end;

(c) the second following joint with motor, reduction gear and a coupling flange for the following robot part is supported in the fork-like extension of the first joint so that it can be tilted, and (d) the rotation of the output part of the reduction gear of the first flange can be converted into a tilting motion of the second joint via a force-locking connection.

In this manner, very fast and nevertheless precise gripper and tool orientations are possible. It is furthermore achieved by the physical separation of the tilting axis of the first joint from the motor and the gear that the occurring mass inertia forces are kept relatively small, so that high speeds of motion are permissible.

The force-locking connection can be realized here to advantage by using gears or miter gears and pre-tensioned bearings for the individual intermediate elements.

BRIEF DESCRIPTION OF THE DRAWINGS

The invention will be explained in greater detail in the following detailed description with reference to the drawings, in which.

DETAILED DESCRIPTION

Figure 1:
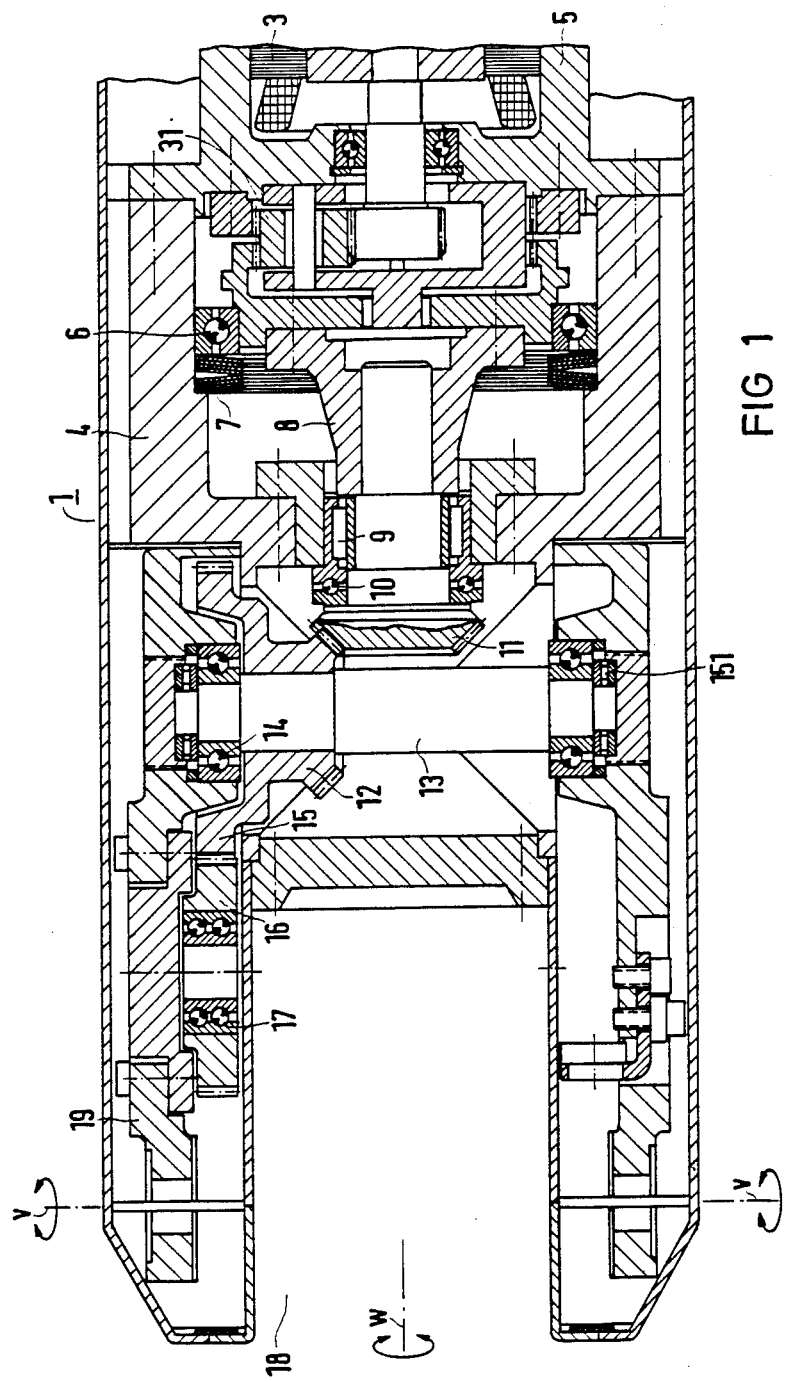
FIG. 1 is a longitudinal cross-sectional view of a first joint according to the invention.

With reference now to the drawings, a first joint 1 comprises a tubular or box-like housing 4 which is closed off at one end by a housing 5. Via the housing 4, the joint arrangement can be coupled to a preceding robot arm, not shown. Within the housing 5, an electric motor 3 is arranged which is followed axially by a reduction gear 31, for instance, a planetary gear. To the reduction gear 31 supported in the housing 4 via ball bearings 6, a flange 8 is coupled in the axial longitudinal direction, the shaft of which is supported radially via a roller bearing 9 and axially via a bearing 10 at a part connected to the housing 4. The bearing 10 is pre-tensioned by the spring 7.

The shaft of the flange 8 supports at its end face a miter gear 11 which meshes with a miter gear 12 on a shaft 13. The shaft 13 is arranged perpendicularly to the longitudinal axis of the flange 8. The shaft 13 itself is in turn supported radially in roller bearings 14 and axially in bearings 151.

Figure 2:
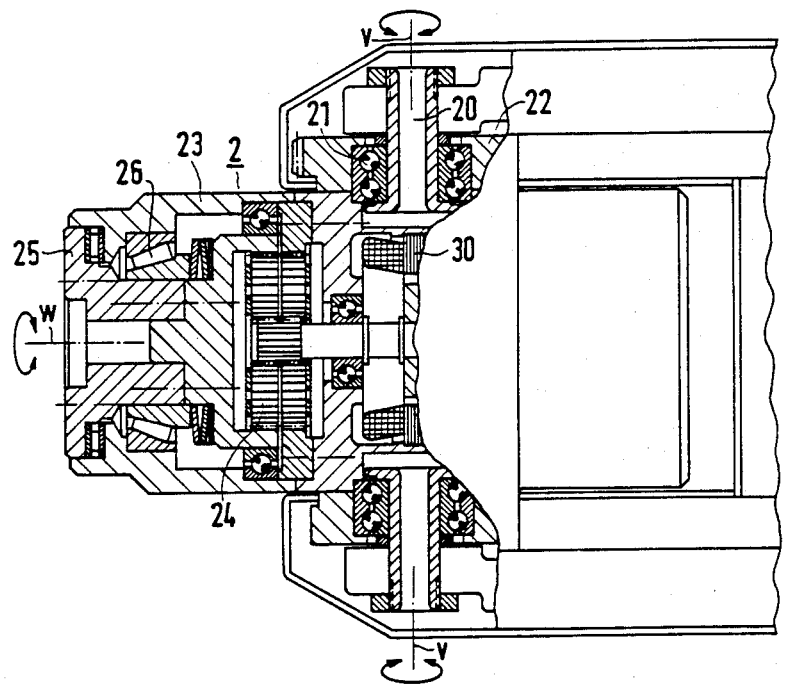
FIG. 2 is a longitudinal cross-sectional view of a second joint which can be supported by the joint shown in FIG. 1.

The rotary motion of motor 3 which is transmitted to the shaft 13 via the miter gear 11 is transmitted, via a gear 15 structurally connected to the gear 12, to an intermediate gear which is supported in a bearing system 17. In the frontmost part 18 of the fork-like extension 19 of the joint 1, a divided or split shaft 20 (FIG. 2) can then be arranged, secured against rotation, on which the joint 2 can be tilted by means of the bearing 21.

In the same plane and surrounding the bearing 21, a gear 22 is provided which is connected to housing 23 of the joint 2 and with which the intermediate gear 16 meshes in the assembled condition. If the motor 3 rotates, the joint 2 is tilted about the divided shaft 20 via the described force-locking connection and does not provide a substantial bending moment to the divided shaft.

The joint 2 likewise contains an electric motor 30 with appropriate control arrangements, a following axial reduction gear 24 and a mounting flange 25 which is likewise intercepted via pre-tensioned conical roller bearings 26 and to which the next robot part, not shown, as a rule, the tool, can be coupled for rotation in the W-axis.

As shown, the joint 2 is surrounded to a considerable extent by the fork-like extension 19 of the joint 1, and the tilting axis V is disposed through the joint 2 in such a manner that it goes approximately through the center of gravity.

By the above-described design, a very short distance between the tilting axis and the tool clamping surface is obtained.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A robot joint arrangement having two joints arranged in tandem for providing a tilting motion in two orthogonal tilting axes, electric motor means and reduction gear means being provided in the joints, and wherein:

the motor means and the axially adjacent reduction gear means of a first of said joints are coupled to a preceding robot part by a mechanical connection;

said first joint includes a fork-like extension at one end thereof;

a second of said joints has motor means, reduction gear means and a coupling flange for coupling to a following robot part, said coupling flange being coupled to said second joint by a pretensioned conical roller bearing means and being supported in said fork-like extension of said first joint so that the second joint can be tilted; and the rotation of an output part of the reduction gear means of the first joint can be converted into a tilting motion of the second joint by a force-locking connection means;

said reduction gear means of said first joint being coupled to flange means having a first shaft supported axially and radially in bearing means, said axial bearing means being pretensioned and said first shaft being provided with a miter gear at an end face thereof;

said miter gear meshing with a further miter gear which is arranged on a second shaft disposed perpendicularly to the longitudinal direction of said first joint, said second shaft being supported radially and axially in further bearing means and being disposed parallel to the tilting axis of the second joint, the rotary motion of said second shaft being converted into the tilting motion of the second joint located in said fork-like extension, the tilting axis of the second joint being disposed approximately through the center of gravity thereof, and further comprising a further shaft comprising a split shaft disposed parallel to said second shaft with the motor of said second joint means being disposed between first and second portions of said split shaft, said portions of said split shaft each supporting additional bearing means, said additional bearing means being disposed in the same plane as drive gear means surrounding said additional bearing means and coupled to said additional bearing means, whereby said drive gear means does not provide a substantial bending moment to said split shaft, said drive gear means being coupled for rotary motion with said further miter gear, said drive gear means being coupled to the housing of said second joint means for providing said tilting motion to said second joint means.

* * * * *